Aug. 5, 1958  J. J. TWARDOWSKI  2,845,715
COMBINED MEASURING AND SCRIBING TOOL
Filed March 24, 1955  2 Sheets-Sheet 1
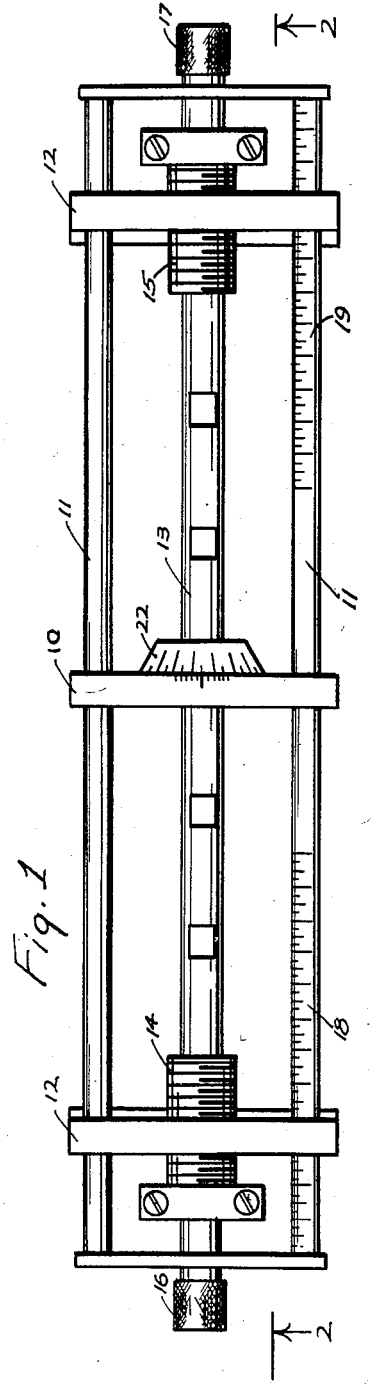
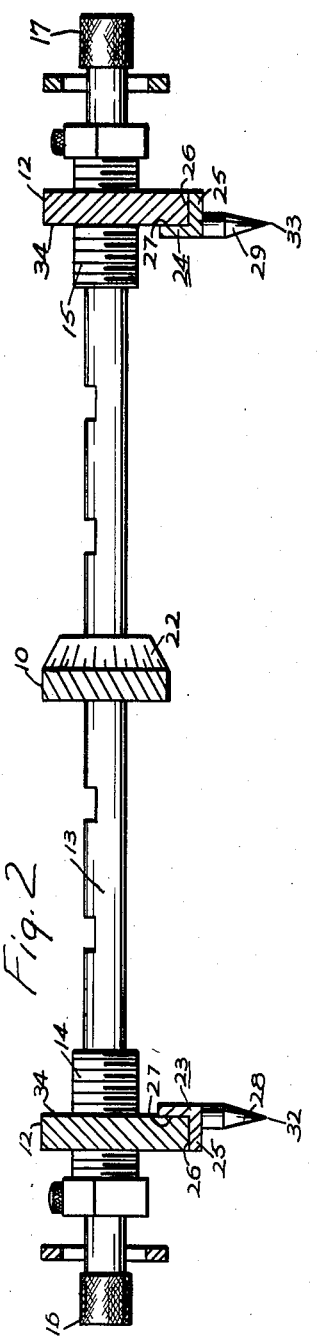
INVENTOR.
JOHN J. TWARDOWSKI
BY
HIS ATTORNEY Aug. 5, 1958 J. J. TWARDOWSKI 2,845,715
COMBINED MEASURING AND SCRIBING TOOL
Filed March 24, 1955 2 Sheets-Sheet 2
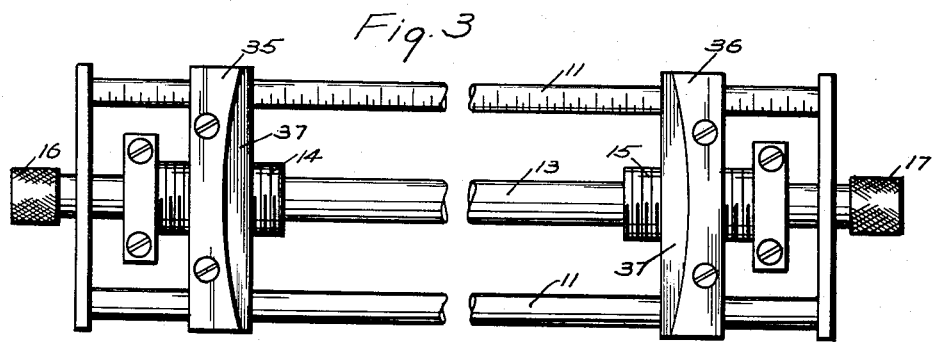
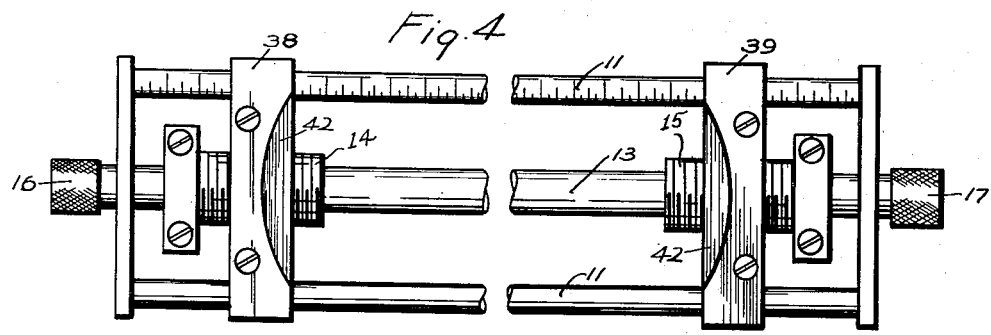
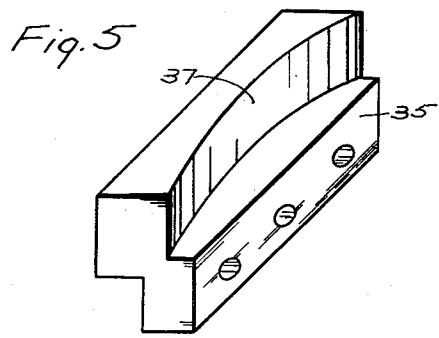
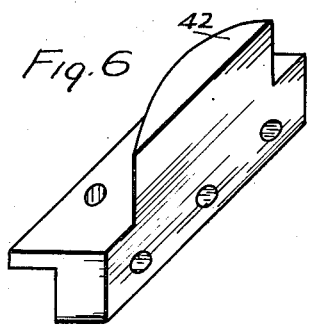
INVENTOR.
JOHN J. TWARDOWSKI
BY Joshua R. H. Potts
HIS ATTORNEY

United States Patent Office 2,845,715
Patented Aug. 5, 1958

2,845,715

COMBINED MEASURING AND SCRIBING TOOL

John J. Twardowski, New York, N. Y.

Application March 24, 1955, Serial No. 496,454

2 Claims. (Cl. 33—159)

This invention relates in general to instruments for the precision measurement of diameters and/or scribing of surfaces, and has as its principal object, the provision of certain desired improvements over the measuring and scribing tool described in my Patent No. 2,578,615, dated December 11, 1951.

Prior to the present invention it was impossible to make a direct reading when making certain measurements, with an instrument of the type disclosed in my prior patent. While the device of my prior patent was designed primarily for measuring planar distances and scribing, it was possible to employ that instrument for other purposes provided the readings thus obtained were compensated. The tool of my above-cited prior patent comprises essentially a pair of spaced parallel guide bars maintained in operable relation by a fixed central member, A pair of end blocks is slidably mounted on the guide bars, one on each side of the central member. These blocks are moved toward or away from the central member by an adjusting bar disposed between the guide bars and provided with oppositely threaded sleeves which engage correspondingly threaded apertures in the end blocks. A scriber is mounted centrally of each end block, and the distance between these scribers at a particular moment is indicated on a scale disposed on one of the guide bars and a vernier dial fixed to the adjusting bar. It was necessary, for instance when instruments of this type were used for measuring outside diameters, to arrange the carrier blocks in tangential relation to the cylindrical objects to be measured. The reading thus obtained was not indicative of the true diameter of the object since the scale and dial were calibrated to measure the distance between the centrally disposed scribers. Consequently it became necessary to compensate for the distance between the scribers and the inner faces of the end blocks.

A principal object of the invention, therefore, is to provide a combined measuring and scribing tool by means of which various measurements may be made with a high degree of accuracy without the need for adding to or subtracting from the measurement indicated on the scale and vernier dial.

Another object of the invention is to provide a device of the stated character of generally improved form and functional characteristics, and which is characterized by convenience in use and economy of manufacture.

A further object of the invention is to provide a precision measuring instrument for accurate scribing of surfaces and other layout work, which may readily be converted for use in the measurement of diameters of cylindrical objects.

A still further object of the invention is to provide a device of the type mentioned by means of which surface distances, outside diameters, and inside diameters may be efficiently and effectively measured.

A more particular object of the invention is to provide an instrument of the stated type which is calibrated with the inner faces of the end blocks as base points, and which is provided with a plurality of attachments for diverse types of measurements, the critical surfaces of these attachments being in alignment with the inner faces.

Other objects and advantages of the present invention will appear as the description proceeds, and will be more fully understood when taken in connection with the accompanying drawings, wherein:

Fig. 1 is a plan view of a combined measuring and scribing instrument made in accordance with the present invention;

Fig. 2 is an elevational view, partly in section, taken substantially on line 2—2 of Fig. 1;

Fig. 3 is a fragmentary bottom plan view of the instrument of Fig. 1, but showing the outside diameter attachments mounted at the bottom of the end blocks;

Fig. 4 is a view similar to Fig. 3 but showing the inside diameter attachments in position for use;

Fig. 5 is a view in perspective of one of the attachments of Fig. 3; and

Fig. 6 is a view in perspective of one of the inside diameter attachments of Fig. 4.

With reference to the drawings, wherein similar reference characters indicate corresponding parts in the several views, and more particularly to Figs. 1 and 2, the embodiment of the invention therein disclosed comprises essentially a combined measuring and scribing instrument in which a stationary central member 10 is provided with a pair of fixed parallel guide bars 11 on which are slidably mounted end blocks 12. An adjusting bar 13 is centrally mounted between the guide bars 11 for rotation with respect to the member 10. The top side of the bar 13 is provided with a plurality of longitudinally spaced flat recesses for the selective positioning of a pair of oppositely threaded sleeves 14, 15, which engage correspondingly threaded apertures in the end blocks for movement of the end blocks toward or away from the central member 10 as desired. Turning of the bar 13 is conveniently afforded by a pair of knurled knobs 16, 17 mounted at opposite ends of the bar. Upon rotation of the bar 13 in one direction the end blocks 12 will move simultaneously toward or away from the central member 10, as the case may be, and the distance between the blocks 12 at a particular moment will be indicated concurrently on scales 18, 19, which are calibrated to indicate distance between the inner faces of the end blocks 12 to the nearest one-hundredth of an inch. A vernier dial 22 is mounted at one side of the member 10 to indicate the number of thousandths of an inch required to be added to the scale measurement to obtain a high degree of accuracy.

According to the present invention the precision instrument herein disclosed is capable of accurately measuring both outside diameters and planar distances without the need for adding to or subtracting from the reading indicated by the scale and vernier dial. As shown clearly in Fig. 2 a pair of attachments 23, 24 are detachably secured to the bottom portions of the end blocks 12. Each of these attachments 23, 24 comprises an L-shaped body member 25 having an accurately machined horizontal surface 26 and vertical surface 27 for banking engagement with corresponding surfaces of the lower half of the end blocks. By this arrangement, relative movement of the attachments 23, 24 with respect to the end blocks 12 is effectively precluded. Mounted on the lower surface of each attachment is a pair of scribers 28, 29 having points 32, 33 in precise vertical alignment with the inner faces 34 of the end blocks 12. When it is desired to use the present instrument for purposes of scribing, or other layout work, the attachments 23, 24 are mounted in the position shown in Fig. 2, and, because of the alignment of the points 32, 33 of the scribers 28, 29 with the inner faces 34 of the end blocks there is no need to compensate the measurement taken for the distance between the inner faces and the position of the scriber points. For purposes of scribing, the end blocks 12 are moved by the adjusting bar 13 until the desired diameter is indicated on one of the scales and the vernier dial. The entire instrument is then swung about the axis of the center point to obtain the desired result. The measurement of planar distances may be afforded in a similar manner. It will be seen that the instrument of the present invention may be utilized for measuring outside diameters, for instance, merely by removing the attachments 23, 24. The distance between the inner faces 34 of the end blocks 12, at a particular moment, will be indicated directly on the scales and vernier dial.

For measurement of outside diameters there is provided a pair of attachments 35, 36, as shown clearly in Figs. 3 and 5. These attachments are intended to be substituted for the attachments 23, 24 and are characterized by extreme accuracy. With reference now to Fig. 5 the attachment 35 is shown in perspective in this figure as comprising a generally L-shaped member having an arcuate recess 37 formed therein. The attachments 35, 36 are constructed to be secured to the lower portions of the end blocks 12 in a manner similar to the arrangement of the attachments 23, 24. It will be seen that the instrument of the present invention may be placed on a cylindrical object so that the marginal edges of the object are received in the arcuate recess 37, and thus the outside diameter of the object may be accurately ascertained. The attachments 35, 36 are made in matched pairs having recesses representing various diameters. In operating the instrument of the present invention with the attachments 35, 36, a pair of attachments having recesses corresponding to a predetermined approximate diameter is selected and mounted on the instrument in a manner similar to that of attachments 23, 24 in Fig. 2. The tool is then disposed, with the attachments facing downwardly, over the cylindrical object to be measured so that the periphery of the object is received in the recesses. The adjusting bar 13 is then turned to urge the attachments toward the central member 10 and into intimate engagement with the periphery of the object. It will be noted that the centers of the recesses 37 are in alignment with the inner faces of the end blocks 12, and thus a direct reading of the outside diameter of the object may be obtained.

In Figs. 4 and 6 there is shown the instrument of the present invention which is designed for use in the measurement of inside diameters. Instead of the attachments heretofore described a pair of attachments 38, 39 are mounted on the lower portions of the end blocks 12. These attachments, as clearly shown in Fig. 6, comprise a substantially L-shaped member having an arcuate projection 42 formed integrally therewith. In using the present instrument with the attachments 38, 39 the tool is disposed with the shoulders 42 facing downwardly so that they can be received within a hollow cylindrical body. One of the knurled knobs 16 and 17 is then turned to propel the end blocks 12 outwardly from the central fixed member 10. When the arcuate surfaces of the shoulders 42 snugly engage the inside surface of the cylindrical hollow body the midpoints of the shoulders 42 are in precise alignment with the inner faces of the end blocks 12 and a reading on the scale and vernier dial will indicate precisely the true inside diameter of the body.

While certain preferred embodiments of the invention are hereinbefore set forth, it is to be clearly understood that the invention is not to be limited to the exact construction illustrated and described because various modifications of the details may be provided in putting the invention into practice within the purview of the appended claims.

What is claimed:

1. In a combined measuring and scribing tool, a fixed central member, a pair of guide bars carried by said central member in spaced parallel relation and normal to said central member, one of said guide bars being provided with calibrations, a pair of end blocks arranged on opposite sides of said central member and having passages slidably receiving said guide bars, each of said end blocks having a vertical surface normal to said guide bars and a bottom surface parallel to said guide bars, said surfaces being normal to each other and meeting at a corner edge, a central actuating bar rotatably mounted in said fixed member, means for establishing an operating threaded engagement between said operating bar and said end blocks, cooperating elements on said fixed member and said operating bar for providing a venier reading, and a pair of L-shaped attachments detachably secured to said end blocks at said corner edges, each of said attachments having a surface in engagement with the vertical surface of the end block to which it is attached and a second surface normal thereto in engagement with the bottom surface of the end block, each of said L-shaped attachments being adapted to carry either a scriber or a measuring block with the point of the scriber or the effective part of said measuring block lying in the plane of the vertical surface of the end block.

2. In a combined measuring and scribing tool, a fixed central member, a pair of guide bars carried by said central member in spaced parallel relation and normal to said central member, one of said guide bars being provided with calibrations, a pair of end blocks arranged on opposite sides of said central member and having passages slidably receiving said guide bars, each of said end blocks having an inner vertical surface normal to said guide bars and a bottom surface parallel to said guide bars, said surfaces being normal to each other and meeting at an inside corner edge, a central actuating bar rotatably mounted in said fixed member, means for establishing an operating threaded engagement between said operating bar and said end blocks, cooperating elements on said fixed member and said operating bar for providing a vernier reading, and a pair of L-shaped attachments detachably secured to said end blocks at said inside corner edges, each of said attachments having a surface in engagement with the vertical surface of the end block to which it is attached and a second surface normal thereto in engagement with the bottom surface of the end block, each of said L-shaped attachments being adapted to carry either a scriber or a measuring block with the point of the scriber or the effective part of said measuring block lying in the plane of the vertical surface of the end block.

References Cited in the file of this patent

UNITED STATES PATENTS

| | | |
|---|---|---|
| 1,666,934 | Haywood | Apr. 24, 1928 |
| 1,981,911 | Engelsman | Nov. 27, 1934 |
| 2,440,973 | Podolan | May 4, 1948 |
| 2,525,186 | Sosdian | Oct. 10, 1950 |
| 2,529,931 | Gallup | Nov. 14, 1950 |
| 2,578,615 | Twardowski | Dec. 11, 1951 |